(12) United States Patent
Chung et al.

(10) Patent No.: US 10,614,361 B2
(45) Date of Patent: Apr. 7, 2020

(54) COST-SENSITIVE CLASSIFICATION WITH DEEP LEARNING USING COST-AWARE PRE-TRAINING

(71) Applicant: INTEL CORPORATION, Santa Clara, CA (US)

(72) Inventors: Yu-An Chung, Hsinchu (TW); Guang-He Lee, Taipei (TW); Shao-Wen Yang, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 745 days.

(21) Appl. No.: 14/757,959

(22) Filed: Dec. 24, 2015

(65) Prior Publication Data

US 2017/0068888 A1 Mar. 9, 2017

Related U.S. Application Data

(60) Provisional application No. 62/216,129, filed on Sep. 9, 2015.

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 7,818,797 B1* | 10/2010 | Fan | ...................... | H04L 63/1425 |
| | | | | 726/22 |
| 9,015,093 B1* | 4/2015 | Commons | .......... | G01C 21/3602 |
| | | | | 706/26 |
| 2005/0125434 A1* | 6/2005 | Fan | ...................... | G06N 99/005 |
| 2005/0289089 A1* | 12/2005 | Abe | ...................... | G06K 9/6256 |
| | | | | 706/12 |

(Continued)

OTHER PUBLICATIONS

Längkvist, Martin, and Amy Loutfi. "Learning feature representations with a cost-relevant sparse autoencoder." International journal of neural systems 25, No. 01 (2015): 1450034. (Year: 2015).*

(Continued)

*Primary Examiner* — Alexey Shmatov
*Assistant Examiner* — Casey R. Garner
(74) *Attorney, Agent, or Firm* — Finch & Maloney PLLC

(57) ABSTRACT

Classification techniques are disclosed that take into account the "cost" of each type of classification error for minimizing total cost of errors. In one example embodiment, a pre-trained cost-sensitive auto-encoder can be used in combination with a training (fine-tuning) stage for cost-sensitive deep learning. Thus, cost information is effectively combined with deep learning by modifying the objective function in the pre-training phase. By minimizing the modified objective function, the auto-encoder not only tries to capture underlying pattern, it further "learns" the cost information and "stores" it in the structure. By later fine-tuning at the training stage, the classification system yields improved performance (lower cost) than a typical classification system that does not take cost information into account during pre-training.

24 Claims, 13 Drawing Sheets

(56) References Cited

U.S. PATENT DOCUMENTS

| | | |
|---|---|---|
| 2008/0021342 A1 | 1/2008 | Echauz et al. |
| 2008/0065572 A1 | 3/2008 | Abe et al. |
| 2011/0081073 A1 | 4/2011 | Skipper et al. |

OTHER PUBLICATIONS

Jiang, Xiaojuan, Yinghua Zhang, Wensheng Zhang, and Xian Xiao. "A novel sparse auto-encoder for deep unsupervised learning." in Advanced Computational Intelligence (ICACI), 2013 Sixth International Conference on, pp. 256-261. IEEE, 2013. (Year: 2013).*

Miao, Linsong, Mingxia Liu, and Daoqiang Zhang. "Cost-sensitive feature selection with application in software defect prediction." In Pattern Recognition (ICPR), 2012 21st International Conference on, pp. 967-970. IEEE, 2012. (Year: 2012).*

Kukar, Matjaz, and Igor Kononenko. "Cost-Sensitive Learning with Neural Networks." In ECAI, pp. 445-449. 1998. (Year: 1998).*

Margineantu, Dragos Dorin. "Methods for cost-sensitive learning." (2001). (Year: 2001).*

Zadrozny, Bianca, John Langford, and Naoki Abe. "Cost-سensitive learning by cost-proportionate example weighting." In Data Mining, 2003. ICDM 2003. Third IEEE International Conference on, pp. 435-442. IEEE, 2003. (Year: 2003).*

Zadrozny, Bianca, and Charles Elkan. "Learning and making decisions when costs and probabilities are both unknown." In Proceedings of the seventh ACM SIGKDD international conference on Knowledge discovery and data mining, pp. 204-213. ACM, 2001. (Year: 2001).*

Domingos, Pedro. "Metacost: A general method for making classifiers cost-sensitive." In Proceedings of the fifth ACM SIGKDD international conference on Knowledge discovery and data mining, pp. 155-164. ACM, 1999. (Year: 1999).*

Abe, Naoki, Bianca Zadrozny, and John Langford. "An iterative method for multi-class cost-sensitive learning." In Proceedings of the tenth ACM SIGKDD international conference on Knowledge discovery and data mining, pp. 3-11. ACM, 2004. (Year: 2004).*

Elkan, Charles. "The foundations of cost-sensitive learning." In International joint conference on artificial intelligence, vol. 17, No. 1, pp. 973-978. Lawrence Erlbaum Associates Ltd, 2001. (Year: 2001).*

Jan, Te-Kang et al. "Cost-sensitive classification on pathogen species of bacterial meningitis by surface enhanced Raman scattering." In Bioinformatics and Biomedicine (BIBM), 2011 IEEE International Conference on, pp. 390-393. IEEE, 2001. (Year: 2011).*

Li, Yufeng, James Tin-Yau Kwok, and Zhi-Hua Zhou. "Cost-sensitive semi-supervised support vector machine." In Proceedings of the National Conference on Artificial Intelligence, vol. 1, p. 500. 2010. (Year: 2010).*

Tan, Ming. "Cost-sensitive learning of classification knowledge and its applications in robotics." Machine Learning 13, No. 1 (1993): 7-33. (Year: 1993).*

Zhang, Yin, and Zhi-Hua Zhou. "Cost-sensitive face recognition." IEEE transactions on pattern analysis and machine intelligence 32, No. 10 (2010): 1758-1769. (Year: 2010).*

Zhou, Zhi-Hua, and Xu-Ying Liu. "Training cost-sensitive neural networks with methods addressing the class imbalance problem." IEEE Transactions on Knowledge and Data Engineering 18, No. 1 (2006): 63-77. (Year: 2006).*

Fan, Wei, Wenke Lee, Salvatore J. Stolfo, and Matthew Miller. "A multiple model cost-sensitive approach for intrusion detection." In European conference on machine learning, pp. 142-154. Springer, Berlin, Heidelberg, 2000. (Year: 2000).*

Bengio, Yoshua, Pascal Lamblin, Dan Popovici, and Hugo Larochelle. "Greedy layer-wise training of deep networks." In Advances in neural information processing systems, pp. 153-160. 2007. (Year: 2007).*

Burhani H, Feng W, Hu G. Denoising autoencoder in neural networks with modified Elliott activation function and sparsity-favoring cost function. In 2015 3rd International Conference on Applied Computing and Information Technology Jul. 12, 2015 (pp. 343-348). IEEE. (Year: 2015).*

Miyato T, Maeda SI, Koyama M, Nakae K, Ishii S. Distributional smoothing with virtual adversarial training. arXiv preprint arXiv: 1507.00677. Jul. 2, 2015 (Year: 2015).*

Vertechi P, Brendel W, Machens CK. Unsupervised learning of an efficient short-term memory network. InAdvances in Neural Information Processing Systems 2014 (pp. 3653-3661). (Year: 2014).*

Jiang N, Rong W, Peng B, Nie Y, Xiong Z. An empirical analysis of different sparse penalties for autoencoder in unsupervised feature learning. In2015 International Joint Conference on Neural Networks (IJCNN) Jul. 12, 2015 (pp. 1-8). IEEE. (Year: 2015).*

Parikh, Devi and Tsuhan Chen, "Classification-Error Cost Minimization Strategy:DCMS", Bioinformatics and Biomedicine (BIBM), 2011 IEEE International Conference, Nov. 15, 2011, 5 pages.

Zhou, Zhi-Hua and Xu-Ying Liu, "On Multi-Class Cost-Sensitive Learning", Computational Intelligence, 2010, vol. 26, 6 pages.

International Search Report and Written Opinion received for International Application No. PCT/US2016/042294, dated Oct. 12, 2016, 11 pages.

\* cited by examiner

Cost Matrix
400

|  | Predicted 402 | | |
|---|---|---|---|
| Actual 404 | A | B | C |
| A | 0 | 1000 | 10000 |
| B | 10 | 0 | 50 |
| C | 100 | 5 | 0 |

Costs 406

FIG. 4

COST-SENSITIVE CLASSIFICATION WITH DEEP LEARNING USING COST-AWARE PRE-TRAINING

CROSS-REFERENCE TO RELATED APPLICATIONS

This Application claims the benefit of U.S. Provisional Patent Application No. 62/216,129, filed on Sep. 9, 2015, which is herein incorporated by reference in its entirety.

BACKGROUND

In real world scenarios of machine learning tasks, classification "errors" may come with diverse meaning incurring significantly different costs; namely, some types of classification errors or so-called misclassifications may be (much) worse than others. For example, rejecting a valid credit card transaction may just cause an inconvenience, while approving a fraud transaction may result in more severe and long lasting consequences. To this end, a classification system may take into account the "cost" of classification error, generally referred to as cost-sensitive classification. There are a number of existing learning algorithms that attempt to deal with cost-sensitive classification, with a relatively limited degree of success. Such algorithms either presume that all types of misclassifications for a given system incur identical losses, or at best attempt to solve the problem by superficially transforming regular classification algorithms to a cost-sensitive version. For example, one can duplicate a particular training example that belongs to a relatively important class (and thus charge more cost when that training example is misclassified), so that the learning model will encounter that training example more times than the less important ones during training. These various learning algorithms are problematic as they do not fundamentally solve the cost-sensitive learning problem and may introduce additional problems, as will be appreciated in light of this disclosure.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 4 illustrates an example of a cost matrix, in accordance with an embodiment of the present disclosure.

Figure 1:
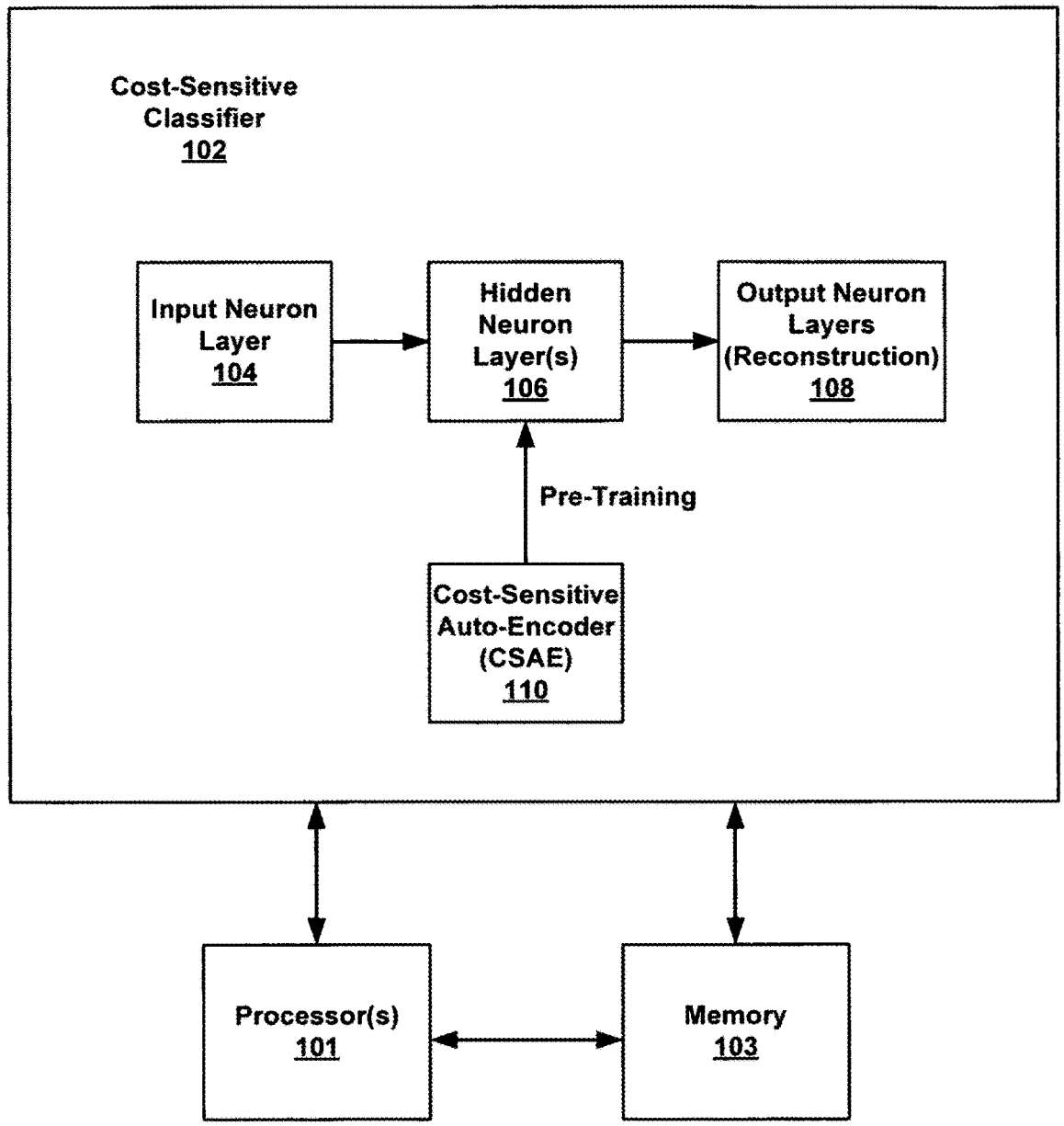
FIG. 1 illustrates a neural network classification system configured in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

Classification techniques are disclosed that take into account the "cost" of each type of classification error for minimizing total cost of errors. In one example embodiment, a pre-trained cost-sensitive auto-encoder can be used in combination with a training (fine-tuning) stage for cost-sensitive deep learning (e.g., a neural network classifier with multiple hidden layers, as will be explained below). Thus, cost information is effectively combined with deep learning by modifying the objective function in the pre-training phase. By minimizing the modified objective function, the auto-encoder not only tries to capture the underlying pattern in the data, it further "learns" the cost information and "stores" it in the structure. By later fine-tuning at the training stage, the classification system yields improved performance (lower cost) than a typical classification system that does not take cost information into account during pre-training.

General Overview

Real world classification tasks oftentimes come with varying costs for misclassifications, e.g., one type of misclassification may be far worse than another; hence, in some applications it may be helpful for learning algorithms to incorporate cost information so as to address the real world problem at hand. For instance, consider visual recognition tasks. Conventional face recognition techniques aimed at attaining the lowest recognition errors possible, assume that all types of misclassifications incur identical loss. This is not necessarily a good assumption. For example, a government official that is misrecognized as an impostor and detained before being allowed to enter a secure facility may result in an inconvenience, while on the other hand, there may be substantial loss or damage and long lasting consequences if an impostor is misrecognized as authorized personnel and allowed to enter a secure facility. A better approach, therefore, is to take into account the cost of every type of error for minimizing the total cost of errors. Existing cost-sensitive learning techniques, however, only take into account cost information either in the testing time or in the training (fine-tuning) stage. In more detail, existing learning algorithms addressing the cost-sensitive classification problem can generally be categorized into prediction time cost awareness and training time cost awareness. The former does not incorporate cost information in the training stage, and perhaps just adopts conventional cost-neutral models for testing on subjects. For example, a naive Bayes classifier can be used to predict the most probable outcome given belief (probability of each possible outcome) and prediction cost. This typically works very well in most applications, though perhaps a drawback lies in the fact that probability output may be out of scale and error-prone. The latter uses cost information, e.g., by deriving a cost-aware loss function or by explicitly duplicating training samples, so as to reflect their importance in the training stage. While such conventional pre-trained networks have been shown to give consistently better generalization of a deep architecture, they fail to consider cost information prior to the training stage, which can be problematic as explained herein.

Thus, and in accordance with an example embodiment of the present disclosure, a cost-aware training approach is provided that takes into account cost information not only in the training (fine-tuning) stage but also in the pre-training stage. In some such embodiments, the approach may be implemented in the context of a deep learning algorithm that solves the cost-sensitive classification problem with a cost-sensitive auto-encoder (CSAE) employed in a pre-training stage. The cost-sensitive auto-encoder can be used in combination with a training (fine-tuning) stage for cost-sensitive deep learning. Thus, cost information is effectively combined with deep learning by modifying the objective function in the pre-training phase. By minimizing the modified objective function, the auto-encoder not only tries to capture the underlying pattern of the input data, it further "learns" the cost information and "stores" it in the structure. By later fine-tuning at the training stage, the classification system (e.g., deep neural network) yields improved performance (lower cost) than a typical classification system that does not take cost information into account during pre-training. Experimental results provided herein show that an approach configured with cost-aware pre-training in accordance with an embodiment outperforms cost-sensitive learning techniques that only account for cost information in either the testing time or the training (fine-tuning) stage.

Learning algorithms for deep architectures such as convolutional neural networks (CNNs) and deep belief networks (DBNs) have been used to produce positive results, often times outperforming the standard algorithms by a large margin, in many areas, especially in computer vision, pattern recognition, natural language processing, etc. Further improved results may often be obtained on supervised learning tasks through the use of unsupervised learning components, generally referred to herein as an unsupervised pre-training stage. This unsupervised pre-training can effectively guide the learning towards attractions of local minima that support better generalization for the training datasets. However, pre-training is cost-neutral and may not be able to guide the learning effectively towards the best local minima. Thus, while pre-training may lead to better results of deep learning algorithms, a better approach may be to introduce unsupervised cost-aware pre-training, so as to make training of deep architectures cost-aware in both (unsupervised) pre-training stage and training (fine-tuning) stage, in accordance with an embodiment of the present disclosure. Numerous classification system configurations and applications will be apparent in light of this disclosure.

Architecture

FIG. 1 illustrates an example neural network classification system 100 including a cost-sensitive classifier 102 configured in accordance with an embodiment of the present disclosure. As can be seen, the system 100 includes a number of processors 101, a memory 103, and a cost-sensitive classifier 102, which may be encoded in the memory 103. The memory 103 may be configured to store data and executable programs and applications, such as the cost-sensitive classifier 102. To this end, the processor 101 may access memory 103 to access the cost-sensitive classifier 102 for execution. The cost-sensitive classifier 102 is programmed or otherwise configured to carry out cost-sensitive classification as variously described herein, and will be discussed in greater detail with reference FIGS. 2-9.

The cost-sensitive classifier 102 is shown to include an input layer 104 of neurons or nodes, one or more hidden layers 106 of neurons or nodes, and an output layer (or reconstruction layer) 108 of neurons or nodes. Additionally, a cost-sensitive auto-encoder (CSAE) 110 is shown to provide pre-training of the classifier 102. These components will be described in greater detail below.

Figure 2:
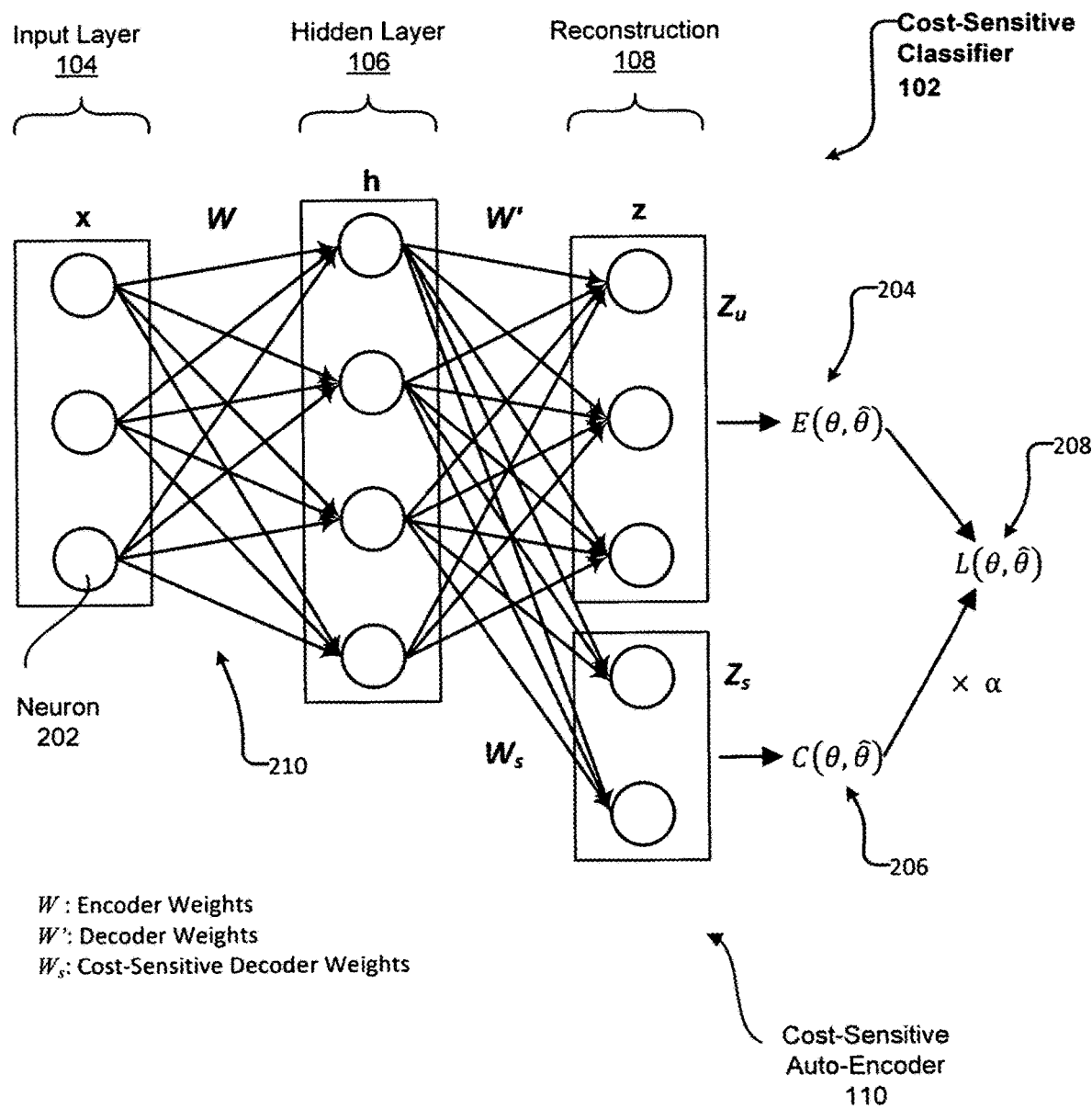
FIG. 2 provides a more detailed illustration of a cost-sensitive classifier configured in accordance with an embodiment of the present disclosure.

FIG. 2 illustrates the cost-sensitive classifier component 102 of a cost-sensitive deep learning system such as neural network classification system 100, in accordance with an embodiment. Each layer (input 104, hidden 106 and reconstruction 108) comprises one or more neurons or nodes 202. The nodes from one layer may be connected to nodes of another layer through weighted paths 210. A cost-sensitive deep neural network typically includes several hidden layers, although only one is illustrated here for simplicity. The various weights, W, W', Ws, associated with the interconnections, and the variables x, h, z, associated with each layer will be discussed in greater detail below in connection with FIG. 5. The basic principle is for the cost-sensitive auto-encoder (CSAE) 110 to pre-train the classifier 102 by jointly embedding cost information C 206 as well as the classifier error E 204 into a modified loss objective function L 208, in the following form:

$$L(\theta,\hat{\theta})=E(\theta,\hat{\theta})+\alpha c(\theta,\hat{\theta}),$$

where $\hat{\theta}$ is an estimation of known parameter $\theta$, E is the original loss function representing just the classifier error, C is the cost function associated with the classifier error, and $\alpha$ is a regularization parameter that balances the cost and the error.

Note that the cost-sensitive deep learning model of this embodiment incorporates cost information in the pre-training stage, and solves the cost-sensitive learning problem in a fundamental deep learning manner without need to manipulate either the data or the model. In contrast, conventional techniques generally include either data manipulation or model manipulation. Data manipulation retouches the data. The idea is to duplicate data samples as many times as their costs so as to bias the learned model. This may not work well, especially when datasets are not balanced. Model manipulation retouches the model. This requires models to be able to output belief, i.e., probability. A typical such technique may use a Bayes estimator to come up with the best prediction given prediction probabilities and prediction costs. However, probability output can be error-prone as the probabilities may be out of order or out of scale.

In one particular embodiment, the model of FIG. 2 can be implemented in the context of a cost-sensitive deep neural network (CSDNN), although other deep learning environments may be used as well, and the present disclosure is not intended to be limited to any particular type.

Figure 3:
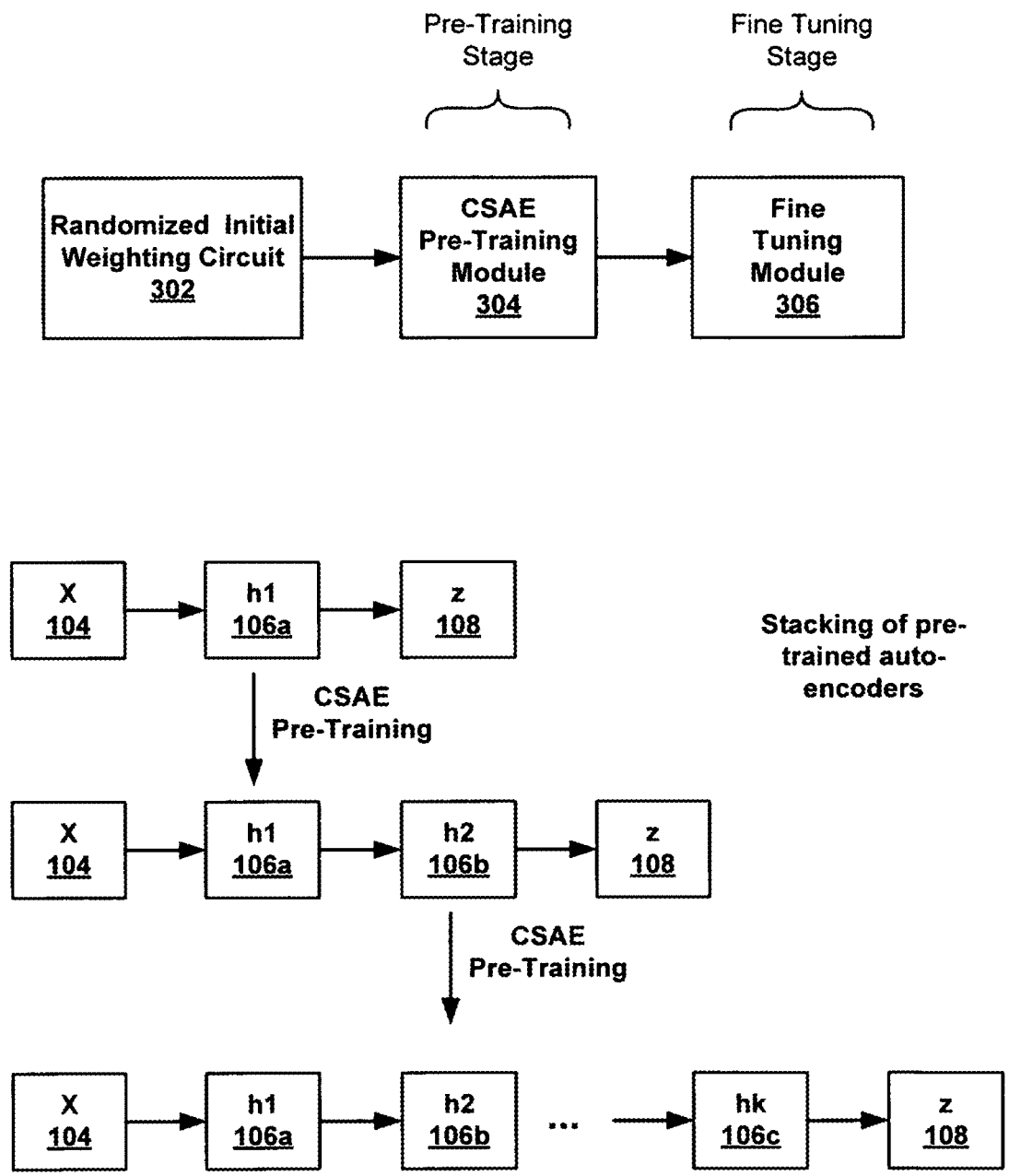
FIG. 3 illustrates provisioning of a neural network classification system, in accordance with an embodiment of the present disclosure.

FIG. 3 illustrates the provisioning or configuration 300 of a neural network classification system 100 for cost-sensitive classification in accordance with an embodiment of the present disclosure. The configuration may begin by setting the weights to a randomized initial state, for example by randomized initial weighting circuit 302. A pre-training stage may be implemented by CSAE pre-training module 304 and applied consecutively to each hidden layer 106a, 106b, . . . 106c, to generate a plurality of pre-trained cost-sensitive auto-encoders (with cost sensitive parameters or weights) that may then be stacked (with decoders removed) to form a deep neural network (DNN), as will be explained in greater detail below. A fine tuning stage may be implemented by fine tuning module 306, to further optimize the DNN parameters using back-propagation to cause them to converge to local or global optima, using known techniques in light of the present disclosure.

FIG. 4 illustrates an example of cost information in the form of a cost matrix 400, in accordance with an embodiment of the present disclosure. The matrix organizes the estimated or predicted classifier outputs A, B, C 402 versus the actual or true values A, B, C 404. The matrix is populated with misclassification costs 406. The diagonal values are all zero since these represent correct classifications. Note that some costs are greater than others. For example, misclassifying A as C has a cost value of 10000 while misclassifying C as B has a cost value of only 5.

Pre-Training with Typical Auto-Encoder

An auto-encoder is a common pre-training technique in deep neural networks, and the goal of pre-training is to find a good starting point in weight space to obtain a model with faster or better convergence. For example, a Denoising Auto-encoder (dA) is often used for improved robustness against outliers and noise.

A conventional auto-encoder generally maps input $x \in [0,1]^d$ (where d is the dimension or number of neurons in the input layer) to a hidden representation $h \in [0,1]^{d'}$, (where d' is the dimension of the hidden layer), and then maps h back to $z \in [0,1]^d$. Though there is the constraint that all data should be in the range [0,1], the technique can be generalized to the real value domain by removing the activation function s(x), explained below, from the output layer. The goal is to learn a set of hidden variables h for reconstructing the input x with minimized reconstruction error. The following equation maps x to h with the encoder parameters—weights W and offsets b:

$$h = s(Wx + b)$$

The following equation maps h to z with the decoder W' & b'.

$$z = s(W'h + b')$$

wherein s is the non-linear activation function (a sigmoid function here) which takes the following form:

$$s(x) = \frac{1}{1 + e^{-x}}$$

to map real valued data of an arbitrary range to the range [0, 1]. The reconstruction error can be measured by squared error (an L2 norm), e.g.:

$$L(x,z) = \|x - z\|_2^2$$

In short, z represents the reconstruction of x using code h.

By minimizing the reconstruction error, the auto-encoder attempts to capture the underlying pattern behind the input feature and generate a higher level representation for the next layer as input. Once the auto-encoder is trained, the decoder layer (W') can be removed, and the encoded layer (W) is used as input for stacking the next auto-encoder. By stacking K auto-encoders, a deep neural network with K layers is pre-trained. In other words, the K-th layer may be trained based on the previously trained K-1 layers because the latent representation from the previous layer can be computed.

Pre-Training with Cost-Sensitive Auto-Encoder

The traditional auto-encoder strategy is used to initialize the deep neural network that deals with 0/1 classification problem, that is, all classification errors are viewed as equivalent. In accordance with an embodiment of the present disclosure, the auto-encoder is made cost-sensitive by embedding cost information into the pre-training phase. Instead of merely minimizing the reconstruction error mentioned above, a second term is added that deals with cost information. Referring again to FIG. 2 a cost-sensitive auto-encoder, configured in accordance with an embodiment of the present disclosure, is illustrated.

As can be seen, additional neurons Zs and cost-sensitive decoder weights Ws have been added that take cost information into account: the hidden representation h not only reconstructs the original input, but also produces the cost of original input. With reference to FIG. 2, note that Ws represents the cost information; namely, the goal is to not only reconstruct x through z but also to reconstruct the cost information using a common set of hidden variables h. This allows the auto-encoder to incorporate the cost information and further extract cost-sensitive features. The derivation of the modified objective function L to be minimized during pre-training will now be discussed.

The following equation represents the functionality of the conventional auto-encoder, mapping h back to reconstruct x:

$$z_u = s(W'h + b')$$

The following equation represents one particular aspect of how the encoder of FIG. 2 differs from the conventional encoder by also mapping h back to reconstruct the cost information of x:

$$z_s = s(W_s h + b_s)$$

The squared-error or L2 norm can be used to measure the similarity between two vectors (e.g., the quality of the mapping):

$$E(x, z_u) = \|x - z_u\|_2^2$$

$$C(c, z_s) = \|c - z_s\|_2^2$$

Then, the modified cost-sensitive objective function can be formulated as the following equation:

$$L_{modified}(x, z) = E(x, z_u) + \alpha \cdot C(x, z_s)$$

The goal, therefore, if to find the weights W' and Ws (and offsets b' and bs) that minimize the objective function $L_{modified}$.

The scale factor α represents a trade-off between the importance of the reconstruction error versus the cost information. The value of the scale factor may be selected to balance those constraints during cost-sensitive pre-training. In the various experimental results discussed below, a is selected among [$10^{-4}$, $10^{-3}$, $10^{-2}$, $10^{-1}$, $10^0$].

In some embodiments, a plurality of pre-trained cost-sensitive auto-encoders are then stacked (with decoders removed) to form a deep neural network with parameters (weights and offsets) initialized by the cost-sensitive pre-training procedure.

Figure 5:
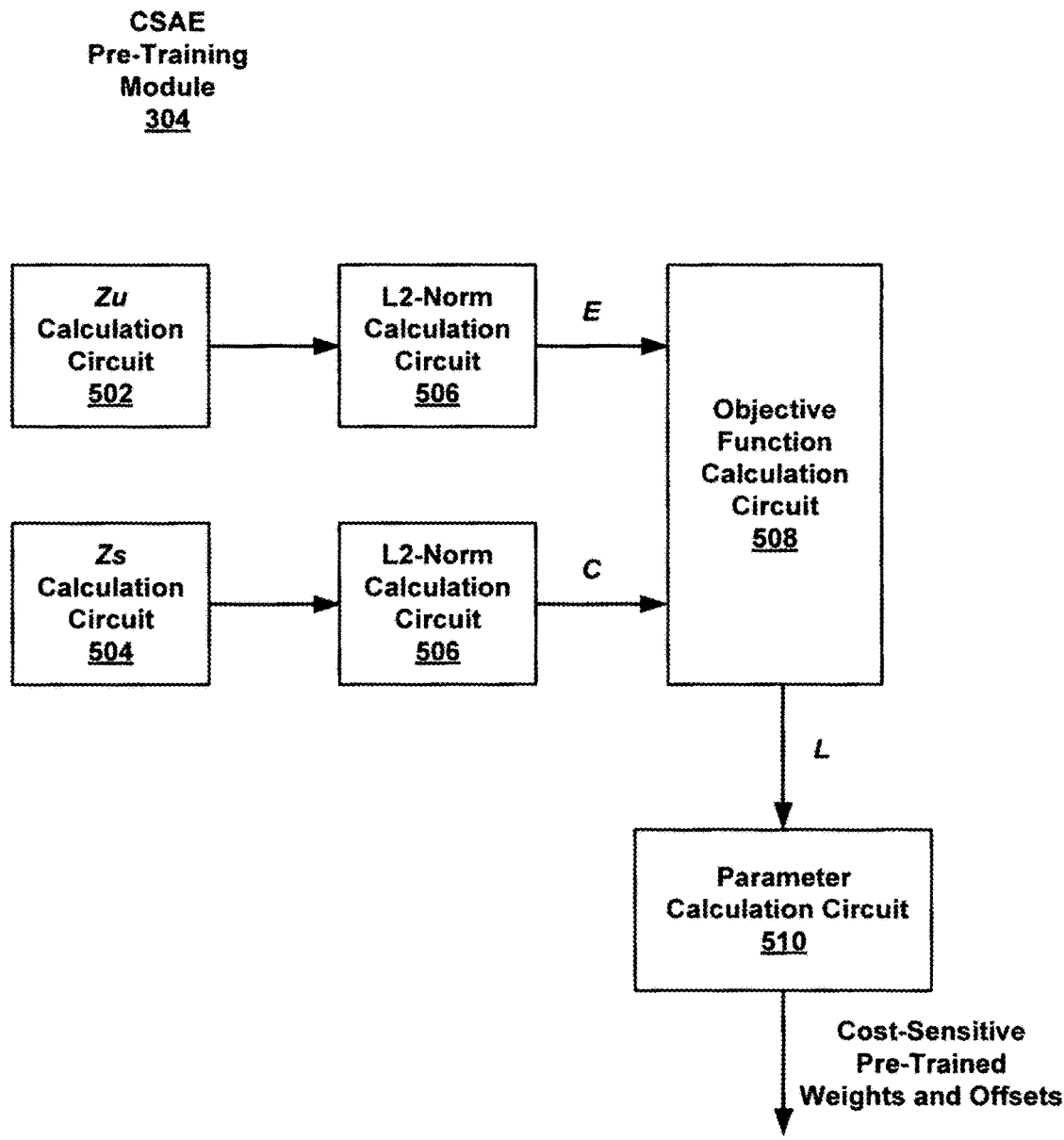
FIG. 5 illustrates a cost-sensitive auto-encoder configured in accordance with an embodiment of the present disclosure.
Figure 6A:
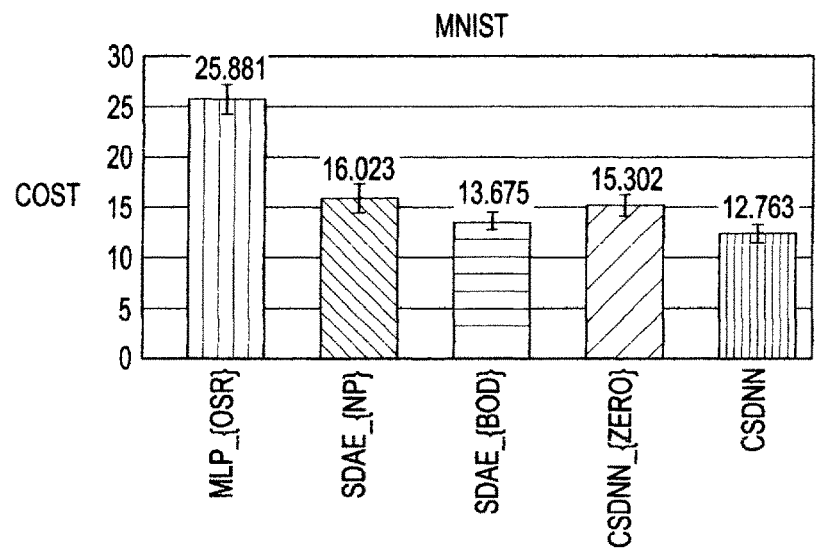
FIGS. 6A through 6I are graphs that show experimental results of a classification system configured in accordance with an embodiment of the present disclosure as compared to experimental results of four other classification systems.
Figure 6B:
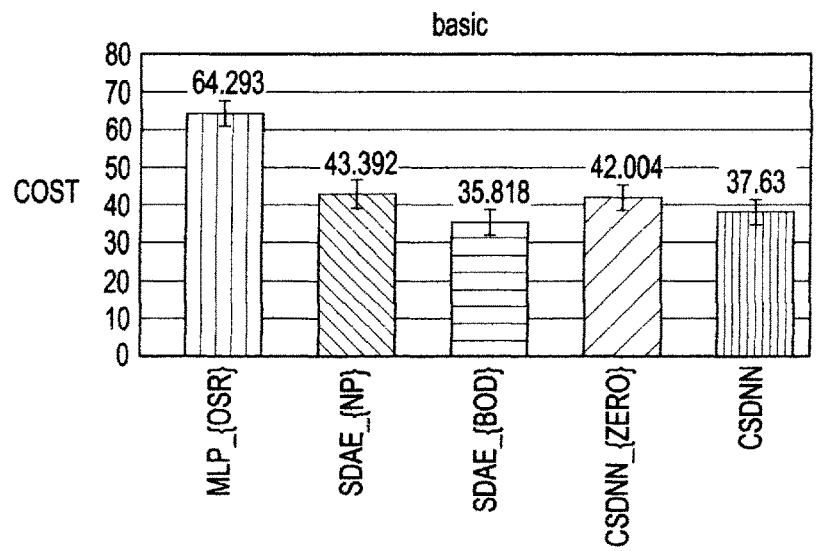
Figure 6C:
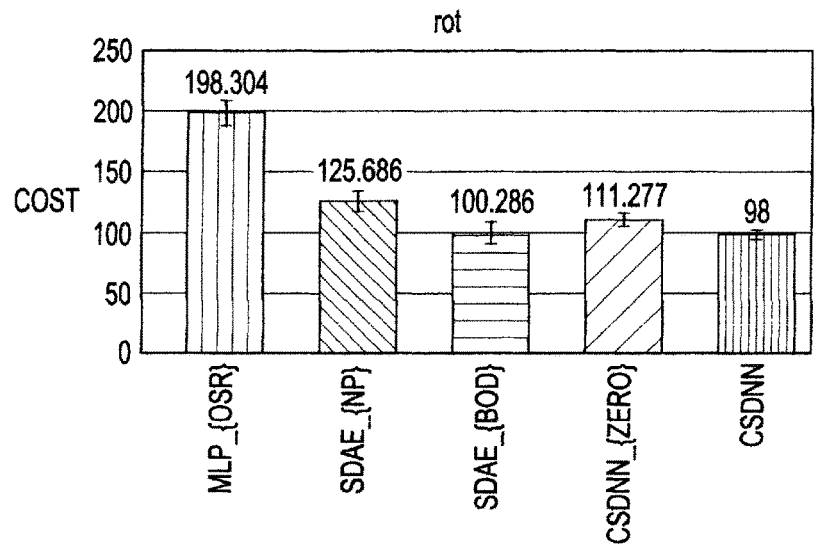
Figure 6D:
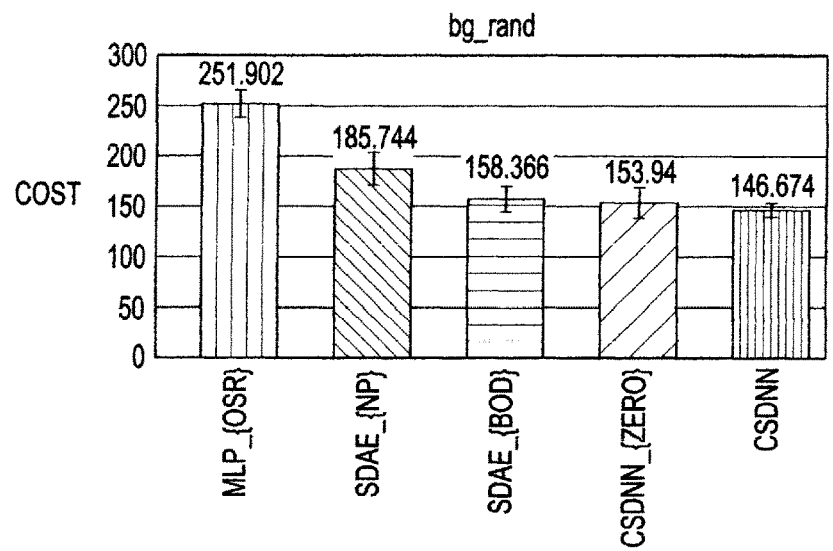
Figure 6E:
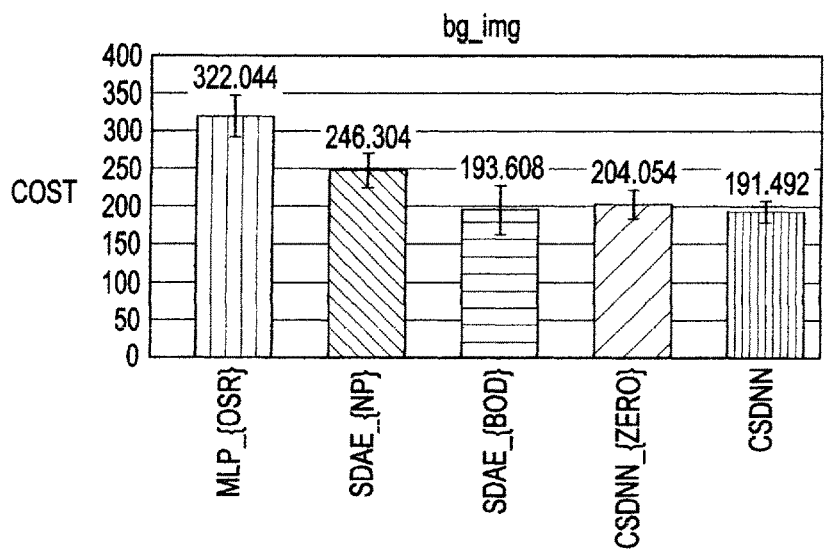
Figure 6F:
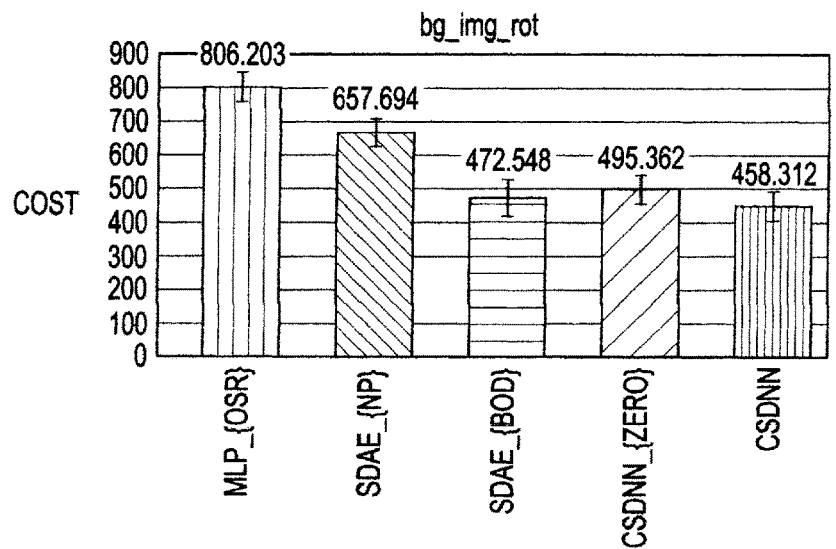
Figure 6G:
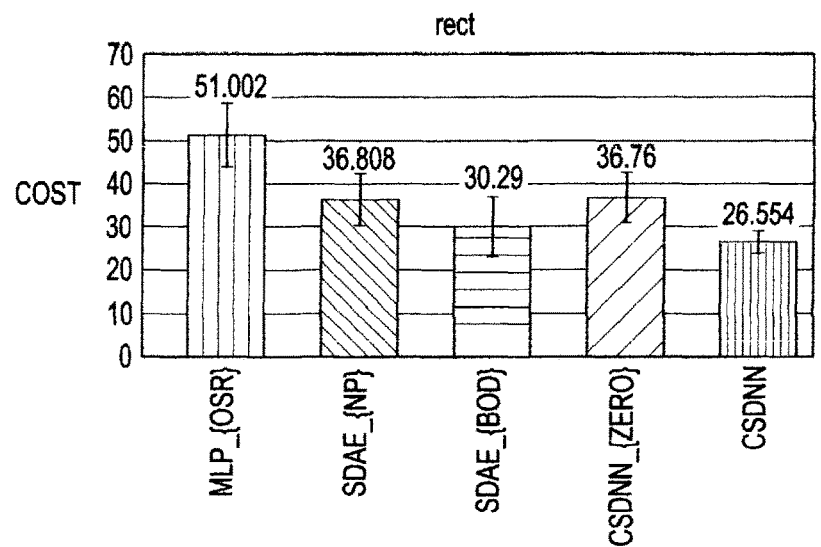
Figure 6H:
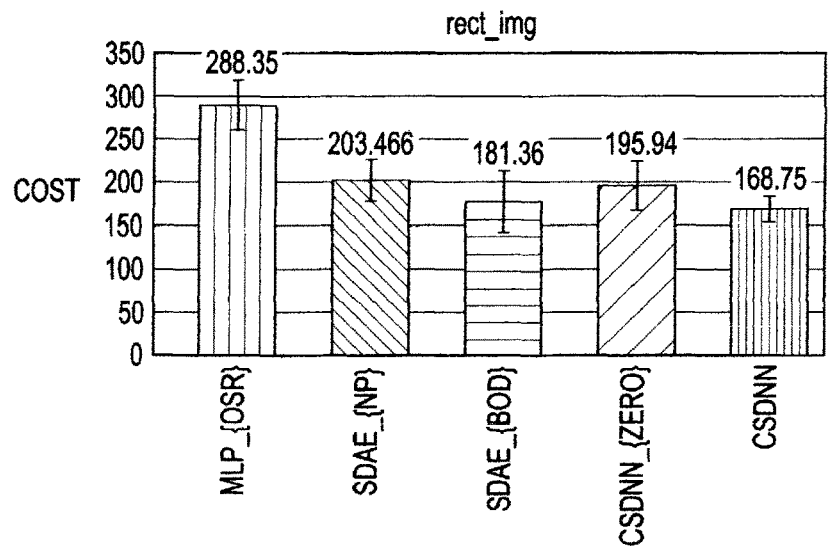
Figure 6I:
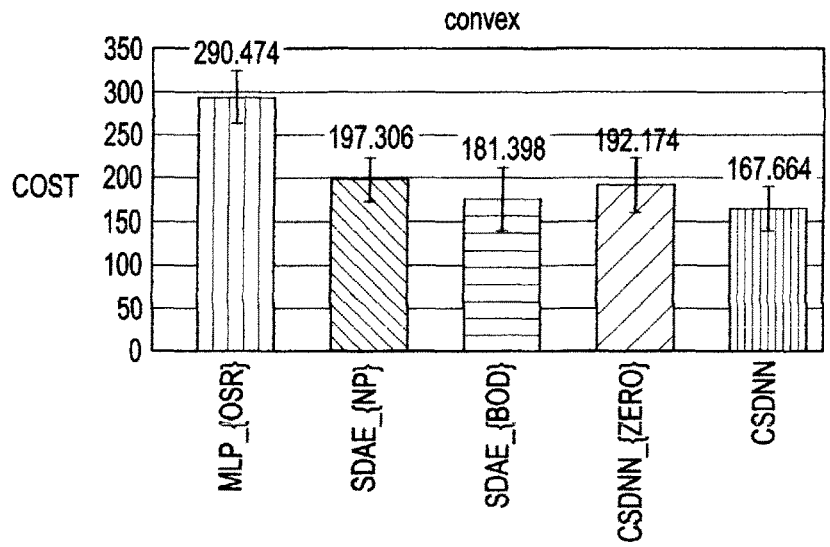
Figure 7A:
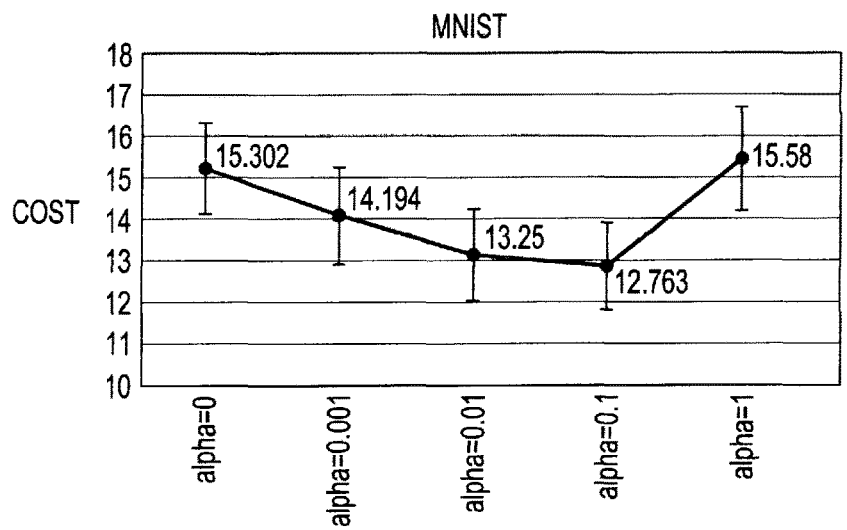
FIGS. 7A through 7I illustrate graphs that plot the relation between a and the test cost, based on experimental results of a classification system configured in accordance with an embodiment of the present disclosure as compared to experimental results of four other classification systems.
Figure 7B:
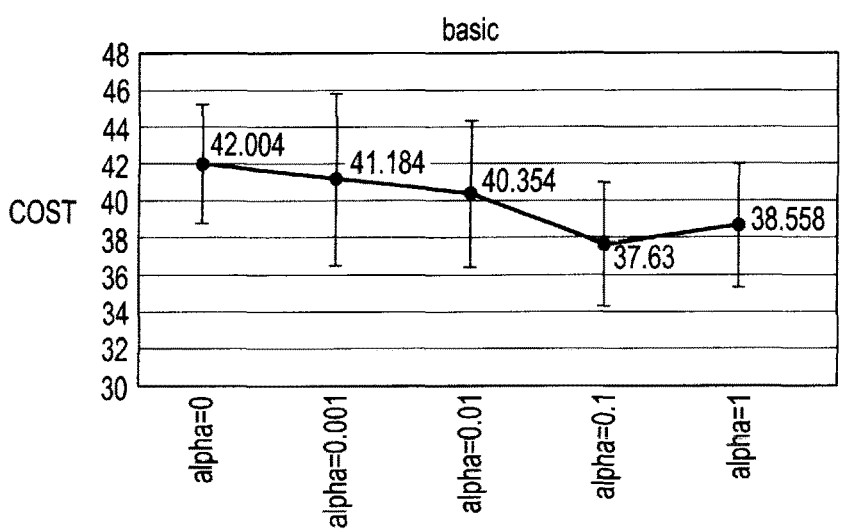
Figure 7C:
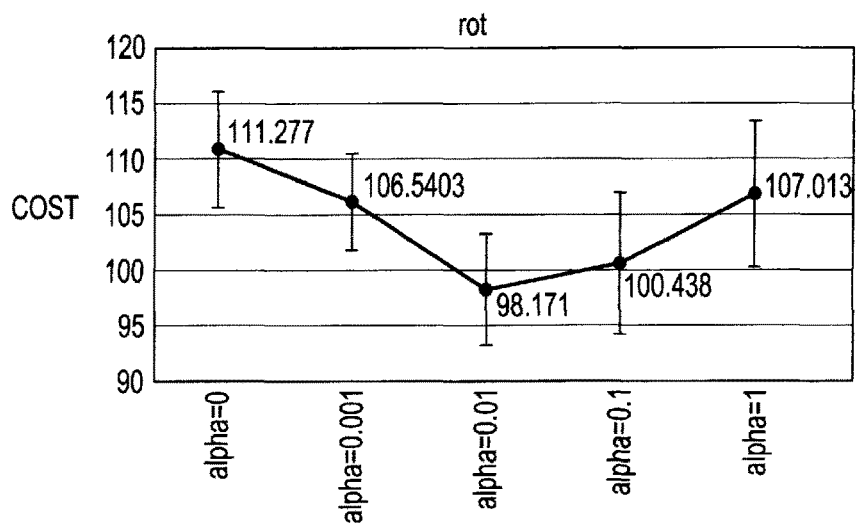
Figure 7D:
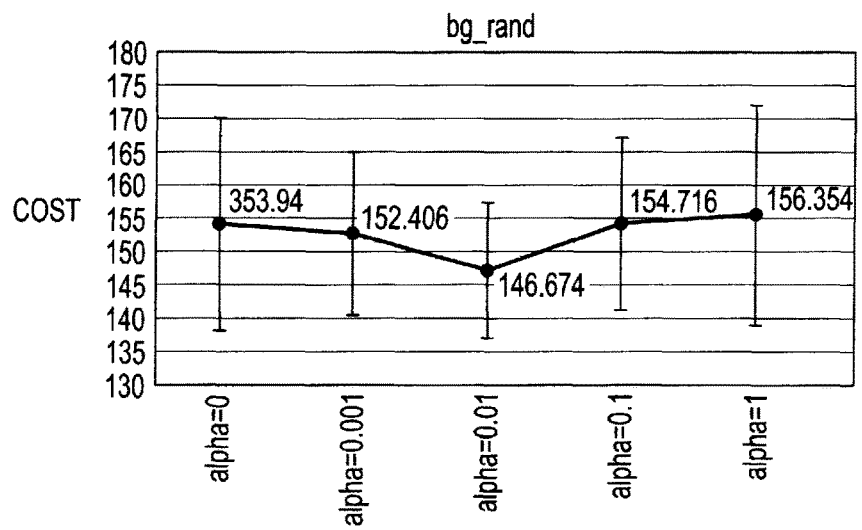
Figure 7E:
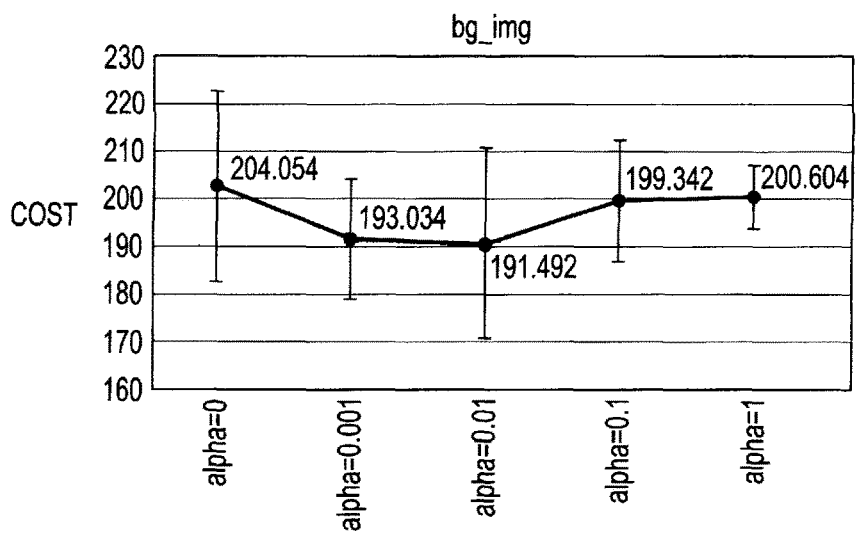
Figure 7F:
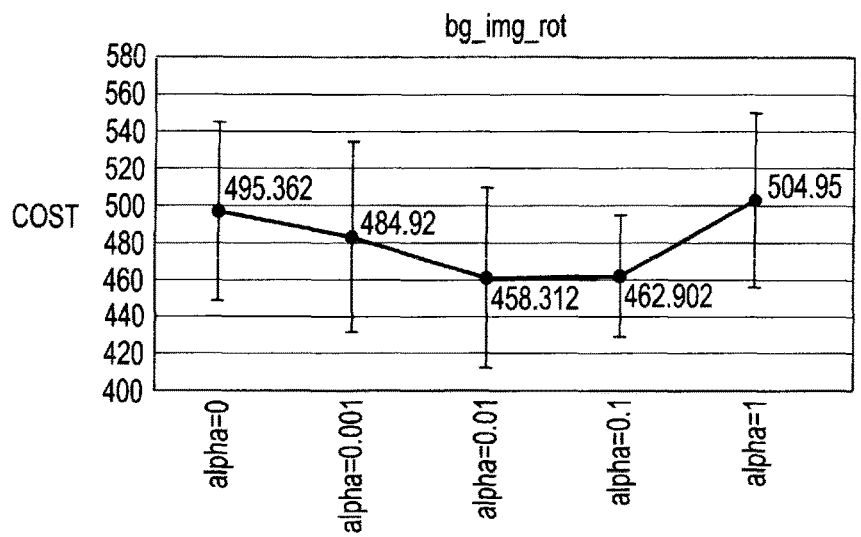
Figure 7G:
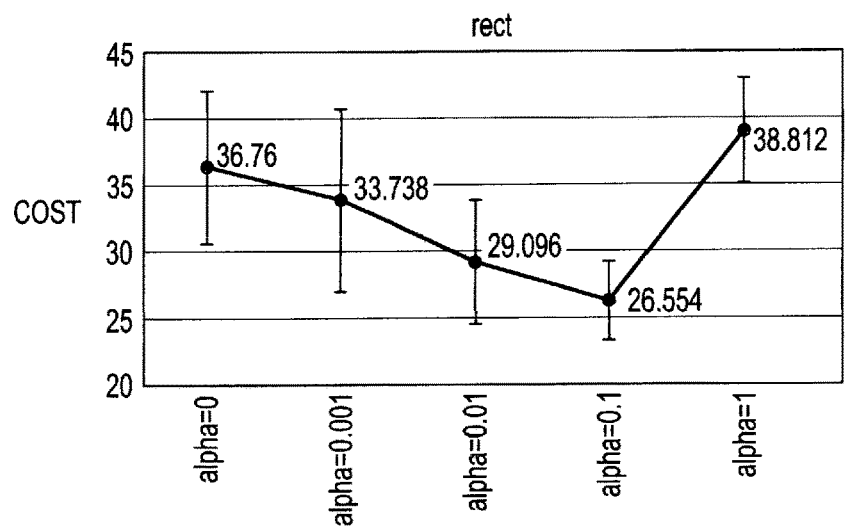
Figure 7H:
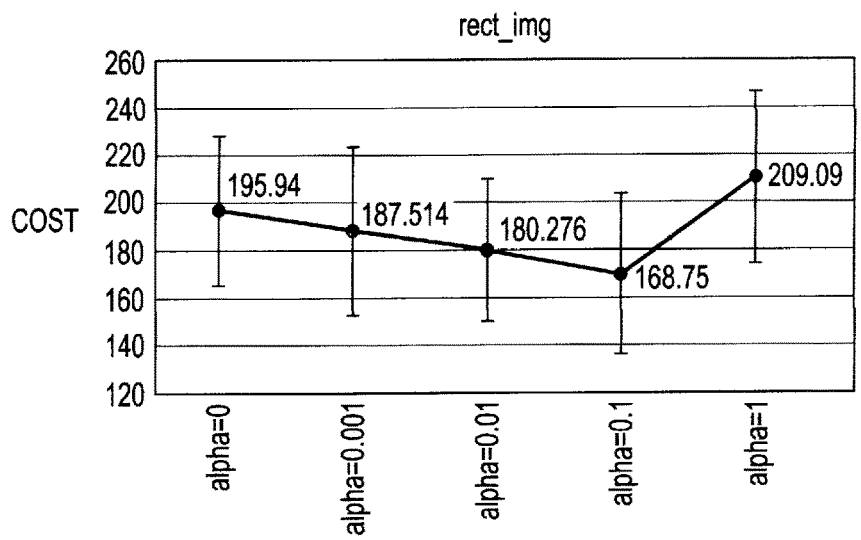
Figure 7I:
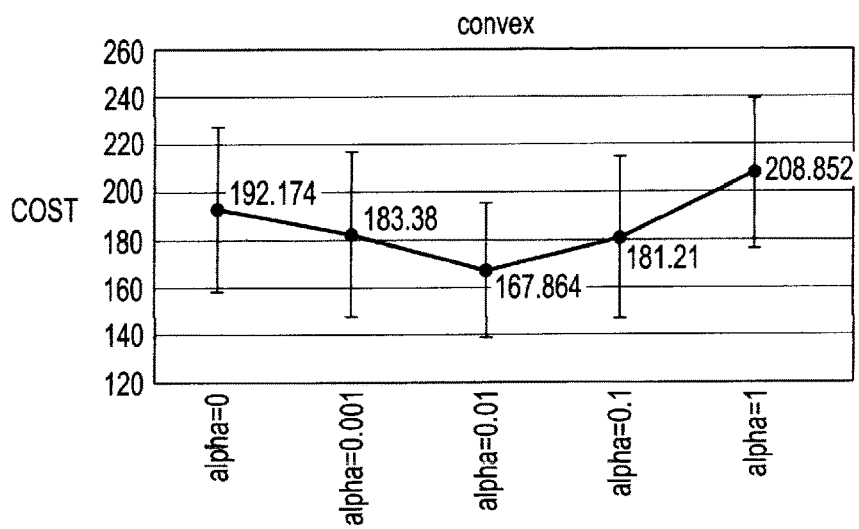

FIG. 5 illustrates a cost-sensitive auto-encoder configured in accordance with an embodiment of the present disclosure. The CSAE pre-training module 304 is shown to include a Zu calculation circuit 502, a Zs calculation circuit 504, an L2-Norm calculation circuit 506, an objective function calculation circuit 508 and a parameter calculation circuit 510.

Zu calculation circuit 502 may be configured to calculate the values of the variables associated with the Zu nodes of the reconstruction layer z that map h back to reconstruct x. Zs calculation circuit 504 may be configured to calculate the values of the variables associated with the Zs nodes of the reconstruction layer z that map h back to reconstruct the cost information associated with x.

L2-Norm calculation circuit 506 may be configured to calculate squared error or L2 norm of the classifier error $E(x, z_u)$ and the cost $C(c, z_s)$. Objective function calculation circuit 508 may be configured to calculate the modified cost-sensitive objective loss function $$L_{modified}(x,z)=E(x,z_u)+\alpha \cdot C(x,z_s)$$

The L2-Norm is presented as one example for measuring error and cost. It will be appreciated that many other techniques may be used including, for example, L1-Norm, average, median, median of medians, random value, minimum, maximum, pick the i-th element, summation, product or summation of odd or even entries, etc.

Parameter calculation circuit 510 may be configured to find calculate the parameters (weights and offsets) that minimize the modified cost-sensitive objective loss function to provide cost-sensitive pre-training of the autoencoder.

Fine-Tuning

The fine-tuning procedure may then be followed to optimize the parameters using back-propagation techniques such that they converge to a relatively better local or global optima compared to the non-pre-trained (e.g., traditional MLP or so-called multilayer perceptron) or cost-insensitive pre-trained (e.g., SDAE or so-called stacked denoising auto-encoder) deep neural network. Fine-tuning may be accomplished, for example, by replacing the last decoder layer with an extra softmax regression layer (e.g., the s(x) sigmoid function) at the end of the deep neural network. The conventional back-propagation algorithm can then be used to optimize the parameters as in the training of a traditional neural network with only a single hidden layer in a supervised manner.

Thus, an embodiment of the present disclosure provides a classifier configured to solve cost-sensitive deep learning using a pre-trained auto-encoder. Cost information is combined with deep learning by modifying the objective function used in the pre-training phase. By minimizing the modified objective function, the auto-encoder not only tries to capture the underlying pattern, it further learns the cost information and stores it in the structure. Through subsequent fine-tuning, empirical evidence indicates that the deep neural network yields improved performance (lower cost) than a deep neural network that does not take cost information into account during pre-training.

Methodology

Figure 8:
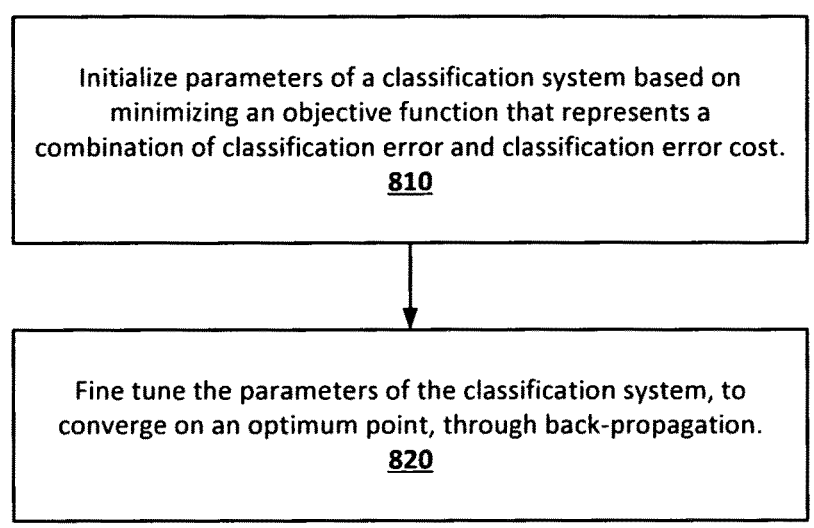
FIG. 8 is a flowchart illustrating a methodology for provisioning a neural network classification system, in accordance with certain of the embodiments disclosed herein.

FIG. 8 is a flowchart illustrating an example method 800 for provisioning or configuring a neural network classification system with cost-sensitive pre-training, in accordance with an embodiment of the present disclosure. As can be seen, example method 800 includes a number of phases and sub-processes, the sequence of which may vary from one embodiment to another. However, when considered in the aggregate, these phases and sub-processes form a process for provisioning a neural network classification system with cost-sensitive pre-training in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIG. 8 to the specific components illustrated in FIGS. 1-5 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 800. Thus other embodiments may have fewer or more modules and/or sub-modules depending on the granularity of implementation. Numerous variations and alternative configurations will be apparent in light of this disclosure.

As illustrated in FIG. 8, in one embodiment, method 800 for provisioning a neural network classification system commences by executing, at operation 810, a cost-sensitive auto-encoder in a pre-training stage. The cost-sensitive auto-encoder is configured to initialize parameters of the classification system based on minimizing an objective function that represents a combination of classification error and classification error cost.

Next, at operation 820, the parameters of the classification system are fine-tuned, for example using back-propagation techniques such that the parameters converge to improved local or global optima.

Of course, in some embodiments, additional operations may be performed, as previously described in connection with the system. In particular, the classification system may be based on a model that includes an input layer of neural nodes, a hidden layer of neural nodes, a reconstruction layer of neural nodes, and a network of weighted interconnections between nodes of adjacent layers. The parameters initialized by the cost-sensitive auto-encoder include these interconnection weights. Additional operations may include, for example, mapping, by the cost-sensitive auto-encoder, input data to a hidden representation associated with the hidden nodes, and mapping the hidden representation back to a reconstruction of the input data and a reconstruction of the cost. Further additional operations may include, for example, stacking a plurality of the cost-sensitive auto-encoders, with respective reconstruction layers removed, to form a deep neural network; and initializing the deep neural network parameters by the cost-sensitive auto-encoder.

Experimental Results

The experiments are conducted on several benchmark datasets available in the deep learning research community. There are nine datasets in total: the well-known MNIST hand-written digits recognition and five of its well-known variants, including randomly rotating the image or adding extra noise in the background, etc (i.e., basic, rot, bg_rand, bg_img, and bg_img_rot). The other three datasets are rect, rect_img, and convex. Table 1 provides a brief description of each of these nine benchmark datasets.

TABLE 1

Nine benchmark datasets

| Dataset | Description | Input | K | Train-Valid-Test |
|---------|-------------|-------|---|------------------|
| MNIST | Standard MNIST digit classification problem | 28 × 28 gray-scale pixel values scaled to [0, 1] | 10 | 50000-10000-10000 |
| basic | Subset of MNIST | | | 10000-2000-50000 |
| rot | MNIST digits with added random rotation | | | |

TABLE 1-continued

Nine benchmark datasets

| Dataset | Description | Input | K | Train-Valid-Test |
|---|---|---|---|---|
| bg_rand | MNIST digits with random noise background | | | |
| bg_img | MNIST digits with random image background | | | |
| bg_img_rot | MNIST digits with random rotation and image background | | | |
| rect | Discriminate between tall and wide rectangles | 28 × 28 gray-scale pixel values scaled to [0, 1] | 2 | 1000-200-50000 |
| rect_img | rect with added random background image | | | 10000-2000-50000 |
| convex | Discriminate between convex and concave shape | | | 6000-2000-50000 |

For purposes of these experiments, the Train-Valid-Test data splits are kept the same as those provided by the source of the benchmark datasets.

Note that since there are currently no existing methods that address a cost-sensitive classification problem with deep learning, these nine datasets come with no cost given. Therefore, the cost must be generated to measure the performance of the techniques provided herein. The generating function for cost information is often used in cost-sensitive learning research community and has a long history. While it may not fully reflect real world conditions, it is still a good choice for a general comparison on cost-sensitive classification algorithms. In particular, the cost matrix is generated in the following manner: consider a cost matrix C of size K×K, where K is the number of classes. Each entry C(y, k) denotes the price to be paid if a class-y example is misclassified as class k. The diagonal entries C(y, y) are set to 0 (no cost is charged if an example is classified correctly), and the other entries C(y, k) are uniformly sampled from $$\left[0, 2000\frac{|\{n: y_n = k\}|}{|\{n: y_n = y\}|}\right],$$

which takes the distribution of amount of all labels into account. Then for each example (x, y), the y-th row C is extracted and becomes its cost information c (a vector, each entry c[k] denotes the price to be paid if x is classified as class k).

FIGS. 6A through 6I are the graphs that display the experiment results, where the y-axis is the cost value. So, the lower the cost value, the better. As cost-sensitive deep neural network (CSDNN) according to an example embodiment is the model used for testing (far right of each graph), and the other four systems tested represent current baseline for cost-sensitive classification.

$MLP_{OSR}$: $MLP_{OSR}$ randomly initializes the weights of the deep neural network and optimize them by one-sided regression. This system's performance is represented by the first or far left vertical bar in each graph of FIGS. 6A through 6I. It consistently has the highest cost value.

$SDAE_{NP}$: $SDAE_{NP}$ stands for Stacked De-noising Auto-encoders using naïve cost prediction, that is, by neglecting any cost information during training and predicting. Thus, this model treats the cost-sensitive classification problem as a regular one. This system's performance is represented by the second vertical bar from the left in each graph of FIGS. 6A through 6I. It consistently has the second to highest cost value.

$SDAE_{BOD}$: The training procedure of $SDAE_{BOD}$ is same as $SDAE_{NP}$, both use the SDAE algorithm for training the deep neural network, while when assigning label to new incoming example x, $SDAE_{BOD}$ takes cost information into account by applying Bayes-Optimal Decision. Bayes-Optimal Decision is a commonly used methodology for predicting label for the cost-sensitive classification problem and its idea is very simple: once a probability estimator p is in hand, when a new example x is fed, Bayes-Optimal Decision computes the expected cost for classifying x to each class with a cost matrix C and assigns x the corresponding label with the lowest expected cost. In particular, Bayes-Optimal Decision does the following computation:

$$g_p\left(\arg\min_{1\le k\le K}\sum_{y=1}^{K}p(y, x)C(y, k)\right)$$

or by vector-matrix formulation:

$$g_p(x) = \arg\min_{1\le k\le K} p^T C$$

where $p \in [0, 1]^K$ denotes the column probability vector estimated by estimator p. In $SDAE_{BOD}$, SDAE plays the role of probability estimator, and applies Bayes-Optimal Decision for prediction. This system's performance is represented by the third vertical bar from the left in each graph of FIGS. 6A through 6I.

$CSDNN_{ZERO}$: α is set to zero during pre-training, that is, the deep neural network is pre-trained only by de-noising criteria without using one-sided regression to learn the cost information. The fine-tuning stage is still done by one-sided regression same as $MLP_{OSR}$. This system's performance is represented by the fourth vertical bar from the left in each graph of FIGS. 6A through 6I.

The performance of each competing model was evaluated by computing their total test cost on the testing set (note that y, i.e., the label, is not needed to compute the cost, the (x, y, c) is to indicate a cost-sensitive example):

$$C_{test} = \sum_{(x,y,c) \in D_{test}} c[g_p(x)]$$

From FIGS. 6A through 6I, it can be clearly seen that except dataset "basic", the CSDNN model configured according to an example embodiment outperforms the other models. Note that for more difficult datasets like bg_img_rot, rect_img, and convex, the CSDNN model is significantly better.

FIGS. 7A through 7I illustrate graphs that plot the relation between a and the test cost. $\alpha$ is on the x-axis and cost is on the y-axis. As can be seen, the U-shaped curve illustrates the existence of a "good" $\alpha$. Recall that a presents a trade-off between the reconstruction error and cost information.

The techniques provided herein can be employed in any number of applications where the cost of classification error is potentially relevant. Facial recognition and banking transactions are two such applications, although numerous applications will be apparent particularly to Internet-of-Things (IoT) service providers, IoT cloud-based service providers; IoT system integrators for smart agriculture, smart factory, and home automation, to name a few examples. The techniques provided herein can help drive the IoT business, for example, by enriching deep learning systems. Dealing with cost-sensitive classification in the deep learning paradigm may generally create great opportunity in IOT applications. Classification systems that employ a technique as provided herein may be detected, for example, using datasets which are imbalanced in cost to check if the given learner behaves as it is expected. Cost-sensitive predictions may project diverse losses as a result whereas the costless counterpart may not.

Example System

Figure 9:
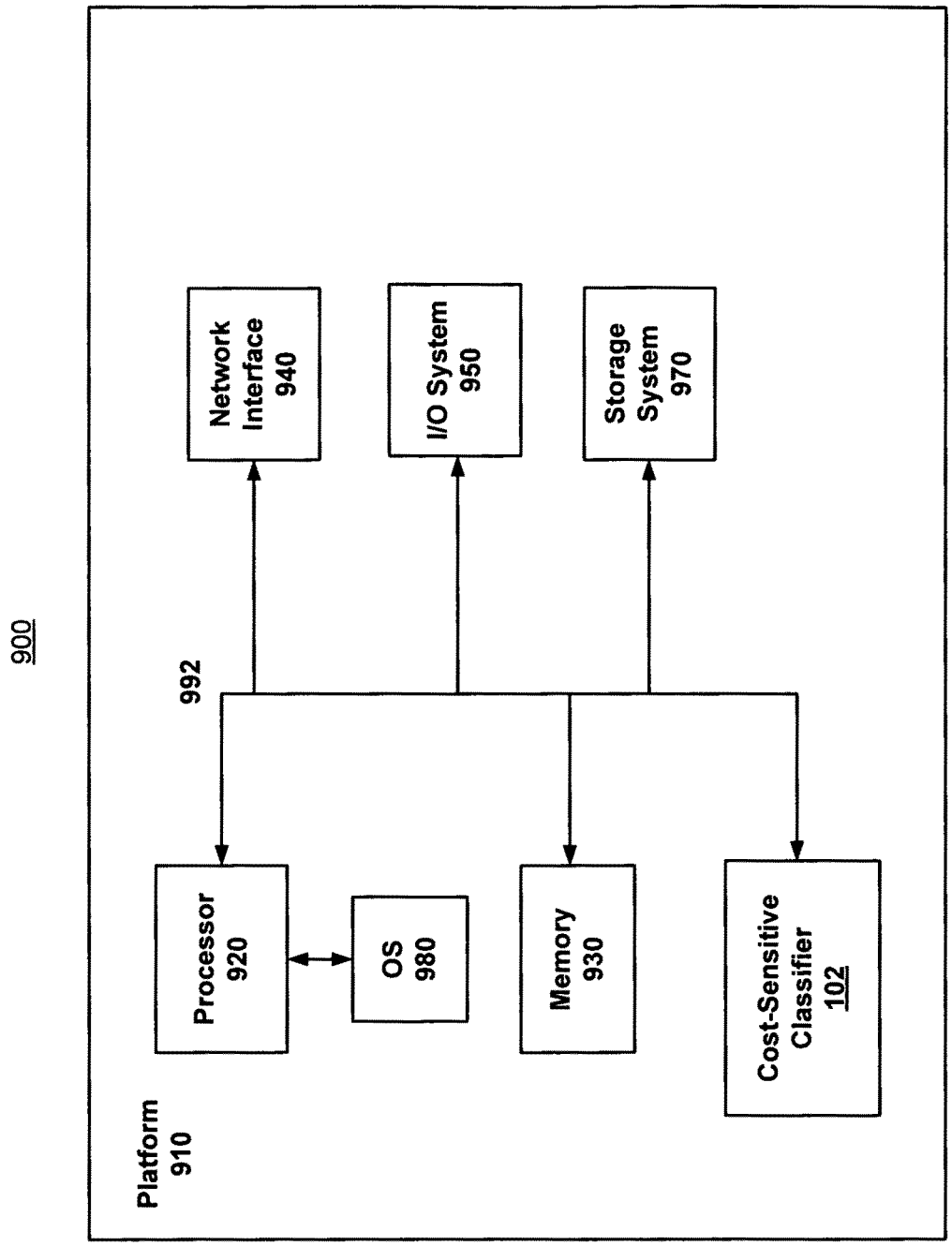
FIG. 9 is a block diagram schematically illustrating a system platform to implement a neural network classifier, configured in accordance with certain of the embodiments disclosed herein.

FIG. 9 illustrates an example system 900 that may be configured to host a neural network classification system, as described herein. In some embodiments, system 900 comprises a platform 910 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), and so forth. Any combination of different devices may be used in certain embodiments.

In some embodiments, platform 910 may comprise any combination of a processor 920, a memory 930, a cost-sensitive classifier 102, a network interface 940, an input/output (I/O) system 950 and a storage system 970. As can be further seen, a bus and/or interconnect 992 is also provided to allow for communication between the various components listed above and/or other components not shown. Platform 910 can be coupled to a network through network interface 940 to allow for communications with other computing devices, platforms or resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor or a graphics processing unit, to assist in control and processing operations associated with system 900. In some embodiments, the processor 920 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, Calif.), Microsoft Windows (Microsoft Corp., Redmond, Wash.), Linux, or Apple OS (Apple Inc., Cupertino, Calif.) and/or various real-time operating systems. As will be appreciated in light of this disclosure, the techniques provided herein can be implemented without regard to the particular operating system provided in conjunction with system 900, and therefore may also be implemented using any suitable existing or subsequently-developed platform.

Network interface module 940 can be any appropriate network chip or chipset which allows for wired and/or wireless connection between other components of computer system 900 and/or the network, thereby enabling system 900 to communicate with other local and/or remote computing systems, servers, and/or resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of platform 910. I/O devices may include, but not be limited to, a display element, keyboard, mouse, speaker, microphone, etc., not shown.

I/O system 950 may include a graphics subsystem configured to perform processing of images for a display element. Graphics subsystem may be a graphics processing unit or a visual processing unit (VPU), for example. An analog or digital interface may be used to communicatively couple graphics subsystem and a display element. In some embodiment, the graphics subsystem could be integrated into processor 920 or any chipset of platform 910.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Cost-sensitive classifier 102 is configured to implement a cost-sensitive auto-encoder for pre-training of the neural network classification system, as described previously. Cost-sensitive classifier 102 can be implemented or otherwise used in conjunction with a variety of suitable software and/or hardware that is coupled to or that otherwise forms a part of system 900.

In some embodiments, Cost-sensitive classifier 102 may be installed local to system 900, as shown in the example embodiment of FIG. 9. Alternatively, system 900 can be implemented in a client-server arrangement wherein at least some functionality associated with these circuits are provided to system 900 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to the network or remotely coupled to the network by one or more other networks and/or communication channels. In some cases access to resources on a given network or computing system may require credentials such as usernames, passwords, and/or compliance with any other suitable security mechanism.

In various embodiments, system 900 may be implemented as a wireless system, a wired system, or a combination of both. When implemented as a wireless system, system 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for cost-sensitive classification, disclosed herein, to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for provisioning a neural network classification system. The method comprises executing, by a processor, a cost-sensitive auto-encoder to initialize parameters of the classification system based on minimizing an objective function that represents a combination of classification error and classification error cost. The method also comprises performing, by the processor, fine tuning of the parameters of the classification system.

Example 2 includes the subject matter of Example 1, wherein the classification system is based on a model that includes an input layer of neural nodes, a hidden layer of neural nodes, a reconstruction layer of neural nodes, and a network of weighted interconnections between nodes of adjacent layers, wherein the parameters include the values of the weights.

Example 3 includes the subject matter of Examples 1 and 2, further comprising mapping, by the cost-sensitive auto-encoder, input data to a hidden representation associated with the hidden nodes, and mapping the hidden representation back to a reconstruction of the input data and a reconstruction of the cost.

Example 4 includes the subject matter of Examples 1-3, further comprising: stacking a plurality of the cost-sensitive auto-encoders, with respective reconstruction layers removed, to form a deep neural network; and initializing the deep neural network parameters by the cost-sensitive auto-encoder.

Example 5 includes the subject matter of Examples 1-4, further comprising calculating the objective function by combining an L2 norm of the classification error and a scaled L2 norm of the classification error cost, the scaling based on a scale factor selected to provide a relative weighting between the classification error and the classification error cost.

Example 6 includes the subject matter of Examples 1-5, further comprising setting the deep neural network parameters to random values prior to initialization by the cost-sensitive auto-encoder.

Example 7 includes the subject matter of Examples 1-6, wherein the fine-tuning further comprises refining the deep neural network parameters through back-propagation such that the parameters converge to improved local or global optima.

Example 8 includes the subject matter of Examples 1-7, wherein the weighted interconnections are further characterized by an offset value and a non-linear activation function.

Example 9 is a neural network classification system. The system comprises a pre-training module including a cost-sensitive auto-encoder to initialize parameters of the classification system based on minimizing an objective function that represents a combination of classification error and classification error cost; and a fine-tuning module to fine tune the parameters of the classification system.

Example 10 includes the subject matter of Example 9, wherein the classification system is based on a model that includes an input layer of neural nodes, a hidden layer of neural nodes, a reconstruction layer of neural nodes, and a network of weighted interconnections between nodes of adjacent layers, wherein the parameters include the values of the weights.

Example 11 includes the subject matter of Examples 9 and 10, wherein the cost-sensitive auto-encoder is to map input data to a hidden representation associated with the hidden nodes, and further to map the hidden representation back to a reconstruction of the input data and a reconstruction of the cost.

Example 12 includes the subject matter of Examples 9-11, wherein a plurality of the cost-sensitive auto-encoders are stacked, with respective reconstruction layers removed, to form a deep neural network, and wherein the deep neural network parameters are initialized by a cost-sensitive pre-training procedure carried out by the pre-training module.

Example 13 includes the subject matter of Examples 9-12, wherein the objective function combines an L2 norm of the classification error and a scaled L2 norm of the classification error cost, the scaling based on a scale factor selected to provide a relative weighting between the classification error and the classification error cost.

Example 14 includes the subject matter of Examples 9-13, wherein the deep neural network parameters are set to random values prior to initialization by the pre-training module.

Example 15 includes the subject matter of Examples 9-14, wherein the fine-tuning module is to refine the deep neural network parameters through back-propagation such that the parameters converge to improved local or global optima.

Example 16 includes the subject matter of Examples 9-15, wherein the weighted interconnections are further characterized by an offset value and a non-linear activation function.

Example 17 is at least one non-transitory computer readable storage medium having instructions encoded thereon that, when executed by one or more processors, result in the following operations for provisioning a neural network classification system. The operations comprise: executing a cost-sensitive auto-encoder to initialize parameters of the classification system based on minimizing an objective function that represents a combination of classification error and classification error cost; and performing fine tuning of the parameters of the classification system.

Example 18 includes the subject matter of Example 17, wherein the classification system is based on a model that includes an input layer of neural nodes, a hidden layer of neural nodes, a reconstruction layer of neural nodes, and a network of weighted interconnections between nodes of adjacent layers, wherein the parameters include the values of the weights.

Example 19 includes the subject matter of Examples 17 and 18, further comprising mapping, by the cost-sensitive auto-encoder, input data to a hidden representation associated with the hidden nodes, and mapping the hidden representation back to a reconstruction of the input data and a reconstruction of the cost.

Example 20 includes the subject matter of Examples 17-19, further comprising: stacking a plurality of the cost-sensitive auto-encoders, with respective reconstruction layers removed, to form a deep neural network; and initializing the deep neural network parameters by the cost-sensitive auto-encoder.

Example 21 includes the subject matter of Examples 17-20, further comprising calculating the objective function by combining an L2 norm of the classification error and a scaled L2 norm of the classification error cost, the scaling based on a scale factor selected to provide a relative weighting between the classification error and the classification error cost.

Example 22 includes the subject matter of Examples 17-21, further comprising setting the deep neural network parameters to random values prior to initialization by the cost-sensitive auto-encoder.

Example 23 includes the subject matter of Examples 17-22, wherein the fine-tuning further comprises refining the deep neural network parameters through back-propagation such that the parameters converge to improved local or global optima.

Example 24 includes the subject matter of Examples 17-23, wherein the weighted interconnections are further characterized by an offset value and a non-linear activation function.

Example 25 is a system for provisioning a neural network classification system. The system comprises: means for executing a cost-sensitive auto-encoder to initialize parameters of the classification system based on minimizing an objective function that represents a combination of classification error and classification error cost; and means for performing fine tuning of the parameters of the classification system.

Example 26 includes the subject matter of Example 25, wherein the classification system is based on a model that includes an input layer of neural nodes, a hidden layer of neural nodes, a reconstruction layer of neural nodes, and a network of weighted interconnections between nodes of adjacent layers, wherein the parameters include the values of the weights.

Example 27 includes the subject matter of Examples 25 and 26, further comprising means for mapping, by the cost-sensitive auto-encoder, input data to a hidden representation associated with the hidden nodes, and means for mapping the hidden representation back to a reconstruction of the input data and a reconstruction of the cost.

Example 28 includes the subject matter of Examples 25-27, further comprising: means for stacking a plurality of the cost-sensitive auto-encoders, with respective reconstruction layers removed, to form a deep neural network; and means for initializing the deep neural network parameters by the cost-sensitive auto-encoder.

Example 29 includes the subject matter of Examples 25-28, further comprising means for calculating the objective function by combining an L2 norm of the classification error and a scaled L2 norm of the classification error cost, the scaling based on a scale factor selected to provide a relative weighting between the classification error and the classification error cost.

Example 30 includes the subject matter of Examples 25-29, further comprising means for setting the deep neural network parameters to random values prior to initialization by the cost-sensitive auto-encoder.

Example 31 includes the subject matter of Examples 25-30, wherein the fine-tuning further comprises means for refining the deep neural network parameters through back-propagation such that the parameters converge to improved local or global optima.

Example 32 includes the subject matter of Examples 25-31, wherein the weighted interconnections are further characterized by an offset value and a non-linear activation function.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for provisioning a neural network classification system, the method comprising:
   executing, by a processor, during a pre-training phase, a cost-sensitive auto-encoder to initialize parameters of the classification system based on minimizing an objective function that represents a combination of classification error and classification error cost, wherein the objective function includes a first function and a second function, the first function including a first set of parameters associated with the classification error and the second function including a second set of parameters associated with the classification error cost, and wherein the first set of parameters are not found in the second function and the second set of parameters are not found in the first function; and
   performing, by the processor, during a training phase occurring after the pre-training phase, fine tuning of the parameters of the classification system, thereby creating a trained classification system configured to provide a cost-sensitive classification for a given classification task.

2. The method of claim 1, wherein the classification system is based on a model that includes an input layer of neural nodes, a hidden layer of neural nodes, a reconstruction layer of neural nodes, and a network of weighted interconnections between nodes of adjacent layers, wherein the parameters include the values of the weights.

3. The method of claim 2, further comprising mapping, by the cost-sensitive auto-encoder, input data to a hidden representation associated with the hidden layer of neural nodes, and mapping the hidden representation back to a reconstruction of the input data and a reconstruction of the cost.

4. The method of claim 2, further comprising:
   stacking a plurality of the cost-sensitive auto-encoders, with respective reconstruction layers removed, to form a deep neural network; and
   initializing the deep neural network parameters by the cost-sensitive auto-encoder.

5. The method of claim 1, further comprising calculating the objective function by combining an L2 norm of the classification error and a scaled L2 norm of the classification error cost, the scaling based on a scale factor selected to provide a relative weighting between the classification error and the classification error cost.

6. The method of claim 4, further comprising setting the deep neural network parameters to random values prior to initialization by the cost-sensitive auto-encoder.

7. The method of claim 4, wherein the fine-tuning further comprises refining the deep neural network parameters through back-propagation such that the parameters converge to improved local or global optima.

8. The method of claim 2, wherein the weighted interconnections are further characterized by an offset value and a non-linear activation function.

9. A neural network classification system, comprising:
   a pre-training module including a cost-sensitive auto-encoder configured to initialize parameters of the classification system based on minimizing an objective function that represents a combination of classification error and classification error cost, wherein the objective function includes a first function and a second function, the first function including a first set of parameters associated with the classification error and the second function including a second set of parameters associated with the classification error cost, and wherein the first set of parameters are not found in the second function and the second set of parameters are not found in the first function, wherein the initialization occurs during a pre-training phase; and
   a fine-tuning module including circuitry configured to fine tune the parameters of the classification system during a training phase occurring after the pre-training phase, thereby creating a trained classification system configured to provide a cost-sensitive classification for a given classification task.

10. The system of claim 9, wherein the classification system is based on a model that includes an input layer of neural nodes, a hidden layer of neural nodes, a reconstruction layer of neural nodes, and a network of weighted interconnections between nodes of adjacent layers, wherein the parameters include the values of the weights.

11. The system of claim 10, wherein the cost-sensitive auto-encoder is further configured to map input data to a hidden representation associated with the hidden layer of neural nodes, and further to map the hidden representation back to a reconstruction of the input data and a reconstruction of the cost.

12. The system of claim 10, wherein a plurality of the cost-sensitive auto-encoders are stacked, with respective reconstruction layers removed, to form a deep neural network, and wherein the deep neural network parameters are initialized by a cost-sensitive pre-training procedure carried out by the pre-training module.

13. The system of claim 9, wherein the objective function combines an L2 norm of the classification error and a scaled L2 norm of the classification error cost, the scaling based on a scale factor selected to provide a relative weighting between the classification error and the classification error cost.

14. The system of claim 12, wherein the deep neural network parameters are set to random values prior to initialization by the pre-training module.

15. The system of claim 12, wherein the fine-tuning module further includes circuitry configured to refine the deep neural network parameters through back-propagation such that the parameters converge to improved local or global optima.

16. The system of claim 10, wherein the weighted interconnections are further characterized by an offset value and a non-linear activation function.

17. At least one non-transitory computer readable storage medium having instructions encoded thereon that, when executed by one or more processors, result in the following operations for provisioning a neural network classification system, the operations comprising:
    executing, during a pre-training phase, a cost-sensitive auto-encoder to initialize parameters of the classification system based on minimizing an objective function that represents a combination of classification error and classification error cost, wherein the objective function includes a first function and a second function, the first function including a first set of parameters associated with the classification error and the second function including a second set of parameters associated with the classification error cost, and wherein the first set of parameters are not found in the second function and the second set of parameters are not found in the first function;
    performing, during a training phase occurring after the pre-training phase, fine tuning of the parameters of the classification system, thereby creating a trained classification system configured to provide a cost-sensitive classification for a given classification task.

18. The computer readable storage medium of claim 17, wherein the classification system is based on a model that includes an input layer of neural nodes, a hidden layer of neural nodes, a reconstruction layer of neural nodes, and a network of weighted interconnections between nodes of adjacent layers, wherein the parameters include the values of the weights.

19. The computer readable storage medium of claim 18, further comprising mapping, by the cost-sensitive auto-encoder, input data to a hidden representation associated with the hidden layer of neural nodes, and mapping the hidden representation back to a reconstruction of the input data and a reconstruction of the cost.

20. The computer readable storage medium of claim 18, further comprising:
    stacking a plurality of the cost-sensitive auto-encoders, with respective reconstruction layers removed, to form a deep neural network; and
    initializing the deep neural network parameters by the cost-sensitive auto-encoder.

21. The computer readable storage medium of claim 17, further comprising calculating the objective function by combining an L2 norm of the classification error and a scaled L2 norm of the classification error cost, the scaling based on a scale factor selected to provide a relative weighting between the classification error and the classification error cost.

22. The computer readable storage medium of claim 20, further comprising setting the deep neural network parameters to random values prior to initialization by the cost-sensitive auto-encoder.

23. The computer readable storage medium of claim 20, wherein the fine-tuning further comprises refining the deep neural network parameters through back-propagation such that the parameters converge to improved local or global optima.

24. The computer readable storage medium of claim 18, wherein the weighted interconnections are further characterized by an offset value and a non-linear activation function.

* * * * *